United States Patent
Tange et al.

(10) Patent No.: US 7,433,769 B2
(45) Date of Patent: Oct. 7, 2008

(54) SYSTEM AND METHOD FOR PREVENTING LANE DEVIATION OF VEHICLE

(75) Inventors: Satoshi Tange, Kanagawa (JP); Genpei Naito, Yokohama (JP); Shinji Matsumoto, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 537 days.

(21) Appl. No.: 10/713,354

(22) Filed: Nov. 17, 2003

(65) Prior Publication Data
US 2004/0107035 A1    Jun. 3, 2004

(30) Foreign Application Priority Data
Nov. 28, 2002    (JP)    ............... 2002-346378

(51) Int. Cl.
  B62D 6/00    (2006.01)
  B62D 6/04    (2006.01)
  G06F 7/00    (2006.01)
(52) U.S. Cl. .................... 701/41; 701/70; 701/301
(58) Field of Classification Search ............ 701/70, 701/78, 91, 301, 36, 45, 82, 23, 41, 300
See application file for complete search history.

(56) References Cited

U.S. PATENT DOCUMENTS

| 4,926,346 | A   |   | 5/1990  | Yokoyama        |         |
|-----------|-----|---|---------|-----------------|---------|
| 6,076,033 | A   | * | 6/2000  | Hamada et al.   | 701/70  |
| 6,216,079 | B1  | * | 4/2001  | Matsuda         | 701/70  |
| 6,282,478 | B1  | * | 8/2001  | Akita           | 701/70  |
| 6,360,170 | B1  |   | 3/2002  | Ishikawa et al. |         |
| 6,370,474 | B1  | * | 4/2002  | Hiwatashi et al.| 701/300 |
| 6,442,469 | B1  | * | 8/2002  | Matsuno         | 701/70  |
| 6,473,678 | B1  | * | 10/2002 | Satoh et al.    | 701/41  |
| 6,487,501 | B1  | * | 11/2002 | Jeon            | 701/301 |
| 6,622,076 | B1  | * | 9/2003  | Eckert et al.   | 701/70  |
| 6,628,210 | B2  | * | 9/2003  | Lee             | 340/988 |
| 6,718,241 | B2  | * | 4/2004  | Kondo et al.    | 701/41  |
| 6,732,021 | B2  | * | 5/2004  | Matsumoto et al.| 701/1   |

(Continued)

FOREIGN PATENT DOCUMENTS

JP    62-155140 A    7/1987

(Continued)

OTHER PUBLICATIONS

U.S. Appl. No. 10/825,108, filed Apr. 16, 2004, Matsumoto et al.

(Continued)

*Primary Examiner*—Thomas G. Black
*Assistant Examiner*—Christine M Behncke
(74) *Attorney, Agent, or Firm*—Foley & Lardner LLP

(57) ABSTRACT

A system for preventing lane deviation of a vehicle is provided. The system comprises a lane detecting device, a running condition detecting device, a deviation judging device, and a vehicle behavior control device. The vehicle behavior control device controls a behavior of the vehicle so as to generate a yaw moment in the direction to prevent the vehicle from deviating from the running lane. The lane detecting device detects the running lane based on a variation in a running direction of the vehicle due to the yaw moment generated by the vehicle behavior control device. A method for preventing lane deviation of a vehicle is also provided.

10 Claims, 3 Drawing Sheets

U.S. PATENT DOCUMENTS

| | | |
|---|---|---|
| 6,823,241 B2 | 11/2004 | Shirato et al. |
| 6,970,777 B2 * | 11/2005 | Tange et al. .................... 701/41 |
| 6,973,380 B2 * | 12/2005 | Tange et al. .................... 701/70 |
| 2004/0098197 A1 | 5/2004 | Matsumoto et al. |
| 2004/0102884 A1 | 5/2004 | Tange et al. |
| 2004/0262063 A1 * | 12/2004 | Kaufmann et al. .......... 180/169 |

FOREIGN PATENT DOCUMENTS

| | | |
|---|---|---|
| JP | 6-225308 A | 8/1994 |
| JP | 11-96497 A | 4/1999 |
| JP | 11-296660 A | 10/1999 |
| JP | 2000-259998 A | 9/2000 |

OTHER PUBLICATIONS

U.S. Appl. No. 10/828,462, filed Apr. 21, 2004, Matsumoto et al.

* cited by examiner

SYSTEM AND METHOD FOR PREVENTING LANE DEVIATION OF VEHICLE

BACKGROUND OF THE INVENTION

The present invention relates to a system and method for preventing a vehicle from deviating from a running lane.

An example of such a system for preventing lane deviation of a vehicle is disclosed in unexamined Japanese patent publication No. 11-96497. The system of this publication determines that a vehicle has a tendency to deviate from a running lane and produces a steering control torque in accordance with lateral displacement of the vehicle from a reference position of a running lane, which steering control torque can be easily prevailed by a vehicle driver, for thereby preventing lane deviation of the vehicle. Further, in such a system, it is desired to keep detecting the running lane at all times. Thus, as disclosed in unexamined Japanese patent publication No. 11-296660, it has been proposed a system in which a steering angle is used as a road parameter, and a lane marker model such as a white line is determined from the road parameter.

SUMMARY OF THE INVENTION

In the meantime, the above-described system for preventing lane deviation of a vehicle requires a steering actuator. To dispense with such a steering actuator, it is considered to control a braking/driving force of each vehicle wheel by utilizing an anti-skid control system or a driving force control system so as to generate a yaw moment of a vehicle and thereby control the running direction of the vehicle.

However, when the system is structured so as to prevent lane deviation of a vehicle by controlling the braking/driving force of each vehicle wheel, the running direction of the vehicle with respect to the running lane is varied by the influence of the yaw moment that is generated by the braking/driving force in addition to the steering input, so that the system is likely to lose the running lane.

It is accordingly an object of the present invention to provide a system for preventing lane deviation of a vehicle which is hard to lose a running lane in consideration of a variation of the running direction of the vehicle due to a yaw moment that is applied to the vehicle for preventing lane deviation.

It is another object of the present invention to provide a method for preventing lane deviation of a vehicle which is carried out by the system of the foregoing character.

To achieve the above object, there is provided according to an aspect of the present invention a system for preventing lane deviation of a vehicle comprising a lane detecting device that detects a running lane of the vehicle, a running condition detecting device that detects a running condition of the vehicle, a deviation judging device that judges based on the detected running lane and the detected running condition whether the vehicle has a tendency to deviate from the running lane, and a vehicle behavior control device that controls a behavior of the vehicle so as to generate a yaw moment in the direction to prevent the vehicle from deviating from the running lane in accordance with the detected running condition when the deviation judging device judges that the vehicle has a tendency to deviate from the running lane, wherein the lane detecting device detects the running lane based on a variation in a running direction of the vehicle due to the yaw moment that is generated by the vehicle behavior control device.

According to another aspect of the present invention, there is provided a method for preventing lane deviation of a vehicle comprising detecting a running lane of the vehicle, detecting a running condition of the vehicle, judging based on the detected running lane and the detected running condition of the vehicle whether the vehicle has a tendency to deviate from the running lane, and controlling a behavior of the vehicle so as to generate a yaw moment in the direction to prevent the vehicle from deviating from the running lane in accordance with the detected running condition when the vehicle is judged to have a tendency to deviate from the running lane, wherein the detecting of the running lane comprises detecting the running lane based on a variation in a running direction of the vehicle due to the yaw moment that is generated by the controlling of the behavior of the vehicle.

DESCRIPTION OF THE PREFERRED EMBODIMENT

Figure 1:
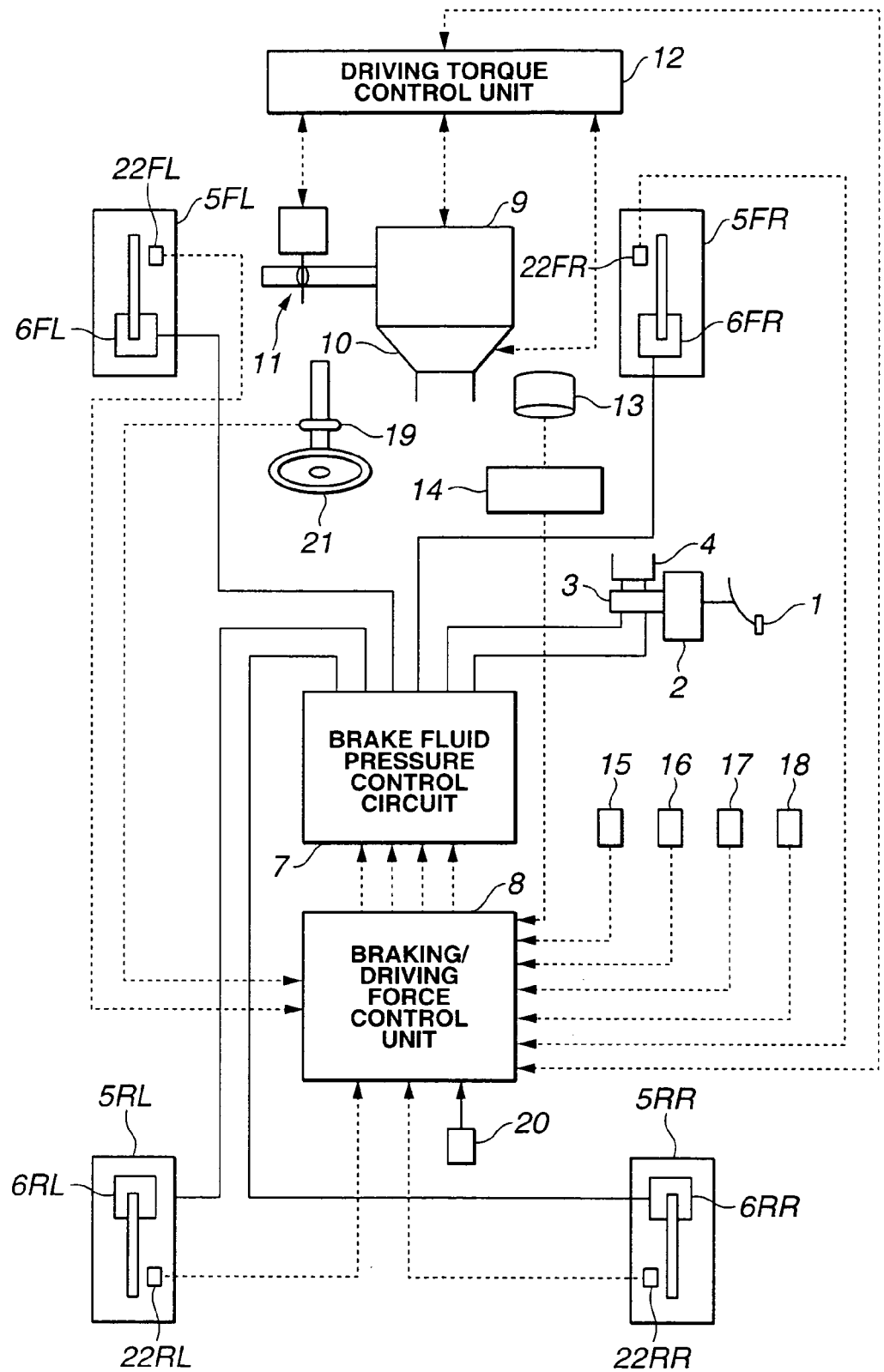
FIG. 1 is a diagrammatic view of a vehicle equipped with a system for preventing lane deviation of a vehicle according to an embodiment of the present invention.
Figure 4:
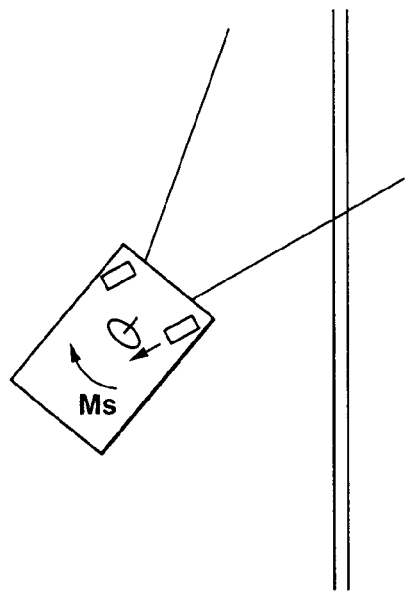
FIG. 4 is a view for illustrating an operation attained by the information processing of FIG. 2.

Referring to FIGS. 1 and 4, inclusive, a system for preventing lane deviation of a vehicle will be described.

A vehicle shown in FIG. 1 is a rear wheel drive vehicle having an automatic transmission, a conventional differential gear and a braking system capable of controlling a braking force of each of front wheels and rear wheels, independently.

In FIG. 1, indicated by 1 is a brake pedal, by 2 is a booster, by 3 is a master cylinder and by 4 is a reservoir. Normally, a brake fluid pressure that is produced by master cylinder 3 in accordance with an amount of depression of brake pedal 1 by a driver is supplied to wheel cylinders 6FL, 6FR, 6RL, 6RR of wheels 5FL, 5FR, 5RL, 5RR, respectively. Between master cylinder 3 and each of wheel cylinders 6FL, 6FR, 6RL, 6RR is interposed brake fluid pressure control circuit 7. Brake fluid pressure control circuit 7 can control therewithin the brake fluid pressure of each of wheel cylinders 6FL, 6FR, 6RL, 6RR independently.

Brake fluid pressure control circuit 7 can be attained by utilizing, for example, a brake fluid control circuit for anti-skid control or traction control. In this embodiment, brake fluid control circuit 7 is structured so as to be capable of increasing or decreasing the brake fluid pressure of each of wheel cylinders 6FL, 6FR, 6RL, 6RR, independently. Brake fluid pressure control circuit 7 controls the brake fluid pressure of each of wheel cylinders 6FL, 6FR, 6RL, 6RR in response to a brake fluid pressure command value from braking/driving force control unit 8.

Further, the vehicle has driving torque control unit 12 for controlling the driving torque to be applied to rear wheels 5RL, 5RR that serve as driving wheels by controlling the operating condition of engine 9, the selected gear ratio of automatic transmission 10 and the opening degree of throttle valve 11. In the meantime, driving torque control unit 12 can control, by itself, the driving torques of rear wheels 5RL, 5RR that serve as driving wheels. However, when driving torque control unit 12 receives a driving torque command value from braking/driving force control unit 8, it controls the driving torques of the driving wheels by reference to the driving torque command value.

Further, the vehicle is equipped with CCD camera 13 and camera controller 14 that serve as an outer vehicle environment recognizing sensor for detecting the position of the vehicle within a running lane for making a judgment on lane deviation of the vehicle. Camera controller 14 is structured so as to be capable of detecting a running lane by detecting a lane marker such as a white line from a forward image of a scene ahead of the vehicle, which image is picked up by CCD camera 13, while being capable of calculating yaw angle φ of the vehicle with respect to the running lane, lateral deviation X from the center of the running lane, curvature β of the running lane, width L of the running lane, etc. In the meantime, when corrected steering angle $\delta_c$ is inputted to camera controller 14 from braking/driving force control unit 8, camera controller 14 detects the running lane by using corrected steering angle $\delta_c$ and calculate the above-described various data with respect to the detected running lane.

Further, the vehicle is equipped with acceleration sensor 15 for detecting longitudinal acceleration Xg and lateral acceleration Yg generated on the vehicle, yaw late sensor 16 for detecting yaw rate φ' generated on the vehicle, master cylinder pressure sensor 17 for detecting the output pressure of master cylinder 3, i.e., master cylinder pressure $P_m$, accelerator opening degree sensor 18 for detecting the amount of depression of accelerator pedal 1, i.e., accelerator opening degree Acc, steering angle sensor 19 for detecting steering angle δ of steering wheel 21, wheel speed sensors 22FL, 22FR, 22RL, 22RR for detecting rotation speeds of wheels 22FL, 22FR, 22RL, 22RR, respectively, i.e., so called wheel speed $Vw_i$ (i=FL, FR, RL, RR) and direction indicating switch 20 for detecting an direction indicating operation by a direction indicator (not shown). Those sensors output detection signals to braking/driving force control unit 8. Further, yaw angle φ with respect to the running lane, lateral displacement X of the vehicle from the center of the running lane, curvature β of the running lane, width L of the running lane, etc., which are detected by camera controller 14 and driving torque Tw controlled by driving torque control unit 12 are outputted collectively to braking/driving force control unit 8. In the meantime, in case the data of the vehicle running conditions have a relation to the left and right directions of the vehicle, the left direction in any of the data is determined to be a positive direction. Namely, yaw late φ', lateral acceleration Yg, steering angle δ and yaw angle φ all become positive at the time of leftward turning, and lateral displacement X of the vehicle becomes positive when the vehicle is displaced to the left from the center of the lane being followed.

Then, referring to the flow chart of FIG. 2, an information processing executed by braking/driving force control unit 8 will be described. The processing is executed every predetermined sampling time ΔT, e.g., every 10 sec., by timer interruption. In the meantime, while the flow chart is not provided with any communication step, the information obtained by the processing is stored in a storage memory and updated at all times and a necessary information is read from the storage memory on occasion.

First in step S1, various data from the above-described various sensors, controllers and control units are read. Concretely, longitudinal acceleration Xg, yaw rate φ', each wheel speed $Vw_i$, accelerator opening degree Acc, master cylinder pressure $P_m$, steering angle δ (i.e., a steering condition parameter indicative of a condition of steering), a direction indicating switch signal, which are detected by the above-described various sensors, and driving torque Tw from torque control unit 12 are read. In the meantime, at this point of time, yaw angle φ, lateral displacement X of the vehicle from the center of the running lane, curvature β of the running lane and width L of the running lane are not read.

Then, the process proceeds to step S2 where running speed V of the vehicle is calculated from the average of left and right front wheel speeds $Vw_{FL}$, $Vw_{FR}$ of the wheel speeds $Vw_i$ that were read in step S1, wheel speeds $Vw_{FL}$, $Vw_{FR}$ being the wheel speeds of driven wheels.

Then, the process proceeds to step S3 where from target yaw moment $M_S$ that was calculated in step S10 of the previous processing, that will be described later and from the following expression (1) is calculated steering angle $\delta_M$ equivalent to target yaw moment $M_S$.

$$\delta_M = M_S / (W_f \times C_f / G_s) \tag{1}$$

where $W_f$ is a front wheel base, $C_f$ is a front wheel cornering power and $G_S$ is a steering gear ratio.

Then, the process proceeds to step S4 where corrected steering angle $\delta_C$ is calculated by adding steering angle $\delta_M$ equivalent to target yaw moment $M_S$ that was calculated in step S3 to steering angle δ that was read in step S1.

Then, the process proceeds to step S5 where an instruction to detect the running lane from the lane maker such as a white line by using corrected steering angle $\delta_C$ and by using the technique disclosed in unexamined Japanese patent publication No. 11-296660, is given to camera controller 14, while at the same time yaw angle φ of the vehicle with respect to the running lane, lateral displacement X of the vehicle from the center of the running lane, curvature β of the running lane and width L of the running lane are calculated and read.

Then, the process proceeds to step S6 where it is determined whether the running lane was detected in step S5. If the running lane was detected, the process proceeds to step S7. If not, the process proceeds to step S10.

In step S7, estimated lateral displacement XS in future is calculated as a deviation estimated value and then the process proceeds to step S8. More specifically, by using yaw angle φ of the vehicle with respect to the running lane, lateral displacement X of the vehicle from the center of the running lane and curvature β of the running lane, that was read in step S5, and running speed V of the vehicle that was read in step S2, estimated lateral displacement XS in future is calculated from the following expression (2).

$$XS = Tt \times V \times (\phi + Tt \times V \times \beta) + X \tag{2}$$

where Tt is a headway time for calculating the forward looking distance and the headway time multiplied by the running speed V of the vehicle makes the forward looking distance. Namely, the estimated lateral displacement of the vehicle from the center of the running lane after the headway time Tt is estimated lateral displacement XS in future. As will be described later, in this embodiment, when estimated lateral displacement XS in future becomes equal to or larger than a predetermined lateral displacement limit, it is determined that the vehicle has a possibility of deviating from the running lane or the vehicle has a tendency to deviate from the running lane.

In step S8, it is determined whether to make a warning against the fact that the vehicle has a tendency to deviate from the running lane and then the process proceeds to step S9. More specifically, a warning is made if absolute value |XS| of the estimated lateral displacement in future that was calculated in step S7 as the deviation estimated value is equal to or larger than lateral displacement limit value $X_C$ that is found by subtracting the half value of width $L_0$ of the vehicle from width L of the running lane that was read in step S5 and a warning is not made if not. Further, in order to prevent hunting of the warning, the threshold value may be provided with a hysteresis. Further, a warning is not made when a lane changing direction estimated by the input from direction indicating switch 20 coincides with the direction along which the vehicle is deviating from the running lane.

In step S9, it is judged whether the vehicle has a tendency to deviate from the running lane and then the process proceeds to step S10. More specifically, similarly to step S8, it is judged that the vehicle has a tendency to deviate from the running lane and deviation judging flag $F_{LD}$ is set when the absolute value $|XS|$ of the estimated lateral displacement in future that was calculated in step S7 as an estimated deviation is equal to or larger than lateral displacement limit value $X_C$, and it is judged that the vehicle does not have a tendency to deviate from the running lane if not. In the meantime, the deviation judging flag $F_{LD}$ is reset when the lane changing direction that is estimated by the input from direction indicating switch 20 coincides with the direction along which the vehicle deviates from the running lane.

Figure 3:
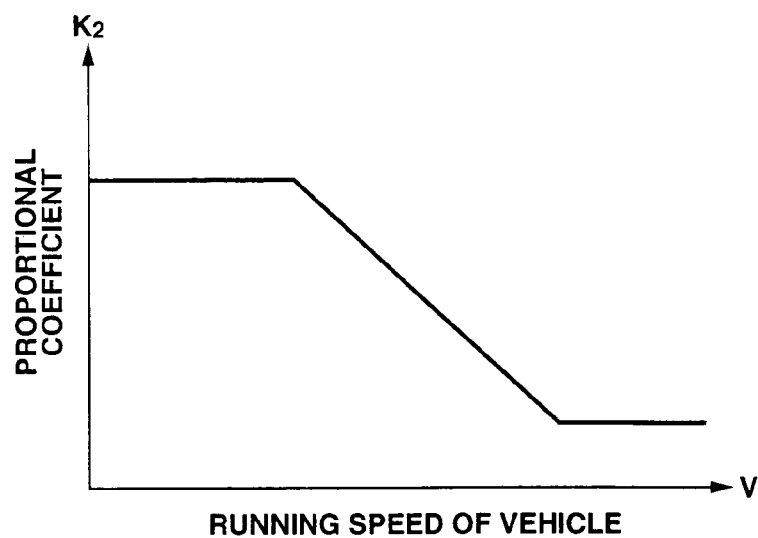
FIG. 3 is a control map utilized in the information processing of FIG. 2.

In step S10, target yaw moment $M_S$ is calculated and set. Herein, target yaw moment $M_S$ is set only when deviation judging flag $F_{LD}$ is set. Thus, when deviation judging flag $F_{LD}$ is set, target yaw moment $M_S$ is calculated from the following expression (3) by using proportional coefficient $K_1$ that is determined from various vehicle parameters, proportional coefficient $K_2$ that is set in accordance with the vehicle running speed V shown in FIG. 3, estimated lateral displacement XS in future that was calculated in step S7, and lateral displacement limit value $X_C$.

$$M_S = -K_1 \times K_2 \times (XS - X_C) \quad (3)$$

In the meantime, when deviation judging flag $F_{LD}$ is reset, target yaw moment $M_S$ is set to be zero.

Then, the process proceeds to step S11, target brake fluid pressure $P_{si}$ for each wheel is calculated.

More specifically, when a rear wheel master cylinder pressure is determined to be $P_{mR}$ based on front and rear braking force distribution in response to the master cylinder pressure $P_m$ that was read in step S1, target brake fluid pressures $P_{SFL}$, $P_{SFR}$ to be supplied to wheel cylinders 6FL, 6FR of left and right front wheels 5FL, 5FR are both determined to be master cylinder pressure $P_m$ and target brake fluid pressures $P_{SRL}$, $P_{SR}$ to be supplied to wheel cylinders 6RL, 6RR of left and right rear wheels 5RL, 5RR are both determined to be rear wheel master cylinder pressure $P_{mR}$ when deviation judging flag $F_{LD}$ is reset.

On the other hand, even when deviation judging flag $F_{LD}$ is set, sorting of cases depending upon the magnitude of the target yaw moment $M_S$ calculated in step S10 is executed. Namely, if absolute value $|M_S|$ of the above-described yaw moment is smaller than predetermined value $M_{S0}$, a difference in the braking force is caused only between left and right rear wheels 5RL, 5RR. If absolute value $|M_S|$ of the above-described yaw moment is equal to or larger than predetermined value $M_{S0}$, a difference in the braking force is caused between left and right front wheels 5FL, 5FR and left and right rear wheels 5RL, 5RR. Accordingly, the difference $\Delta P_{SF}$ in the target brake fluid pressure between left and right front wheels 5FL, 5FR when absolute value $|M_S|$ of the above-described target yaw moment is smaller than $M_{S0}$ is "0 (zero)", and the difference $\Delta P_{SR}$ in the target brake fluid pressure between left and right rear wheels 5RL, 5RR is obtained from the following expression (4). Similarly, the difference $\Delta P_{SF}$ in the target brake fluid pressure between left and right front wheels 5FL, 5FR and the difference $\Delta P_{SR}$ in the target brake fluid pressure between left and right rear wheels 5RL, 5RR when absolute value $|M_S|$ of the above-described target yaw moment is equal to or larger than predetermined value $M_{S0}$ are obtained from the following expressions (5) and (6), respectively. In the expressions, indicated by T is a tread (it is determined that the front wheels and rear wheels are of the same tread), by $K_{bF}$, $K_{bR}$ are conversion coefficients used for conversion of a braking force to a brake fluid pressure and determined based on various braking parameters.

$$\Delta P_{SR} = 2 \times K_{bR} \times |M_S|/T \quad (4)$$

$$\Delta P_{SF} = 2 \times K_{bF} \times (|M_S| - M_{S0})/T \quad (5)$$

$$\Delta P_{SR} = 2 \times K_{bR} \times |M_{S0}|/T \quad (6)$$

Accordingly, target brake fluid pressure $P_{Si}$ to be supplied to respective wheel cylinders 6FL, 6FR, 6RL, 6RR when the above-described target yaw moment $M_S$ is a negative value, i.e., the vehicle has a tendency to deviate from the lane to the left is obtained from the following expression (7).

$$P_{SFL} = P_m$$

$$P_{SFR} = P_m + \Delta P_{SF}$$

$$P_{SFL} = P_m$$

$$P_{SRR} = P_m + \Delta P_{SR} \quad (7)$$

In contrast to this, target brake fluid pressure $P_{Si}$ to be supplied to respective wheel cylinders 6FL, 6FR, 6RR, 6RR when the above-described target yaw moment $M_S$ is a positive value, i.e., the vehicle has a tendency to deviate from the running lane is obtained from the following expression (8).

$$P_{SFL} = P_m + \Delta P_{SF}$$

$$P_{SFR} = P_m$$

$$P_{SFL} = P_m + \Delta P_{SR}$$

$$P_{SRR} = P_m \quad (8)$$

Then, the process proceeds to step S12 where the target driving force of the driving wheels is calculated. In this embodiment, when lane deviation judging flag $F_{LD}$ is set and the lane deviation preventing control is executed, the output of the engine is throttled so as to disable acceleration even when an accelerating operation is performed. Accordingly, target driving torque $Trq_{DS}$ when deviation judging flange $F_{LD}$ is set is determined to be a value that is obtained by subtracting a value corresponding to the sum of differences $\Delta P_{SF}$, $\Delta P_{SR}$ in the brake fluid pressure between front wheels 6FL, 6FR and between rear wheels 6RL, 6RR from a value corresponding to accelerator opening degree Acc that was read in step S1. Namely, the value corresponding to accelerator opening degree Acc is a driving torque for accelerating the vehicle in accordance with accelerator opening degree Acc. The value corresponding to the sum of differences $\Delta P_{SF}$, $\Delta P_{SR}$ in the brake fluid pressure between front wheels 5FL, 5FR and between rear wheels 5RL, 5RR is a braking torque caused by the sum of differences $\Delta P_{SF}$, $\Delta P_{SR}$ in the brake fluid pressure. Accordingly, when lane deviation judging flag $F_{LD}$ is set and the lane deviation preventing control is executed, the torque of the engine is decreased by the amount corresponding to the driving torque caused by the sum of differences $\Delta P_{SF}$, $\Delta P_{SR}$ in the target brake fluid pressure. In the meantime, target driving torque $Trq_{DS}$ when deviation judging flag $F_{LD}$ is reset results from only the driving torque for accelerating the vehicle in accordance with accelerator opening degree Acc.

Then, the process proceeds to step S13 where the target brake fluid pressure of each wheel that was calculated in step S11 is outputted to brake fluid pressure control circuit 7, while at the same time the target driving torque of driving wheels 5RL, 5RR that was calculated in step S12 is outputted to driving torque control unit 12 and thereafter the process returns to a main program.

By the above-described processing, when a lane change is not intended by the driver and estimated lateral displacement XS in future becomes equal to or larger than lateral displacement limit value $X_C$, it is judged that the vehicle has a tendency to deviate from the running lane and deviation judging flag $F_{LD}$ is set, target yaw moment $M_S$ is calculated based on the difference between estimated lateral displacement XS in future and lateral displacement limit value $X_C$, and the braking force of each wheel is controlled so as to generate target yaw moment $M_S$. By this, when the steering input is small, a yaw moment is generated on the vehicle for preventing lane deviation, while at the same time the running speed of the vehicle is decreased by the braking force, thus making it possible to prevent lane deviation of the vehicle more safely.

Further, in this embodiment, when a yaw moment is generated by the braking/driving force control for preventing lane deviation of the vehicle as described above, steering angle $\delta_M$ (steering condition parameter) equivalent to target yaw moment $M_S$ is calculated, steering angle $\delta_M$ is added to steering angle $\delta$ and thereby calculating corrected steering angle $\delta_C$ (corrected steering condition parameter), and corrected steering angle $\delta_C$ is used for detection of the running lane, i.e., the embodiment is structured so as to detect the running lane in consideration of a variation of the running direction of the vehicle due to the yaw moment for preventing lane deviation of the vehicle. As shown in FIG. 4, since the running direction of the vehicle is varied when target yaw moment $M_S$ is generated, the actual steering angle is varied with respect to steering angle $\delta$ corresponding to the steering input by steering angle $\delta_M$ equivalent to target yaw moment $M_S$ and found from the expression (1), so that corrected steering angle $\delta_C$ in consideration of this variation represents the actual direction of the vehicle. Accordingly, by detecting the running lane by the lane marker based on corrected steering angle $\delta_C$, the running lane is more hard to be lost as compared with the detection of the lane marker based on only the steering angle. Further, by controlling the braking/driving force for thereby causing in the vehicle a yaw moment for preventing lane deviation, it is not necessitated any particular steering actuator and decrease in the cost can be attained by using a anti-skid control system or a traction control system that is already present in the vehicle.

Figure 2:
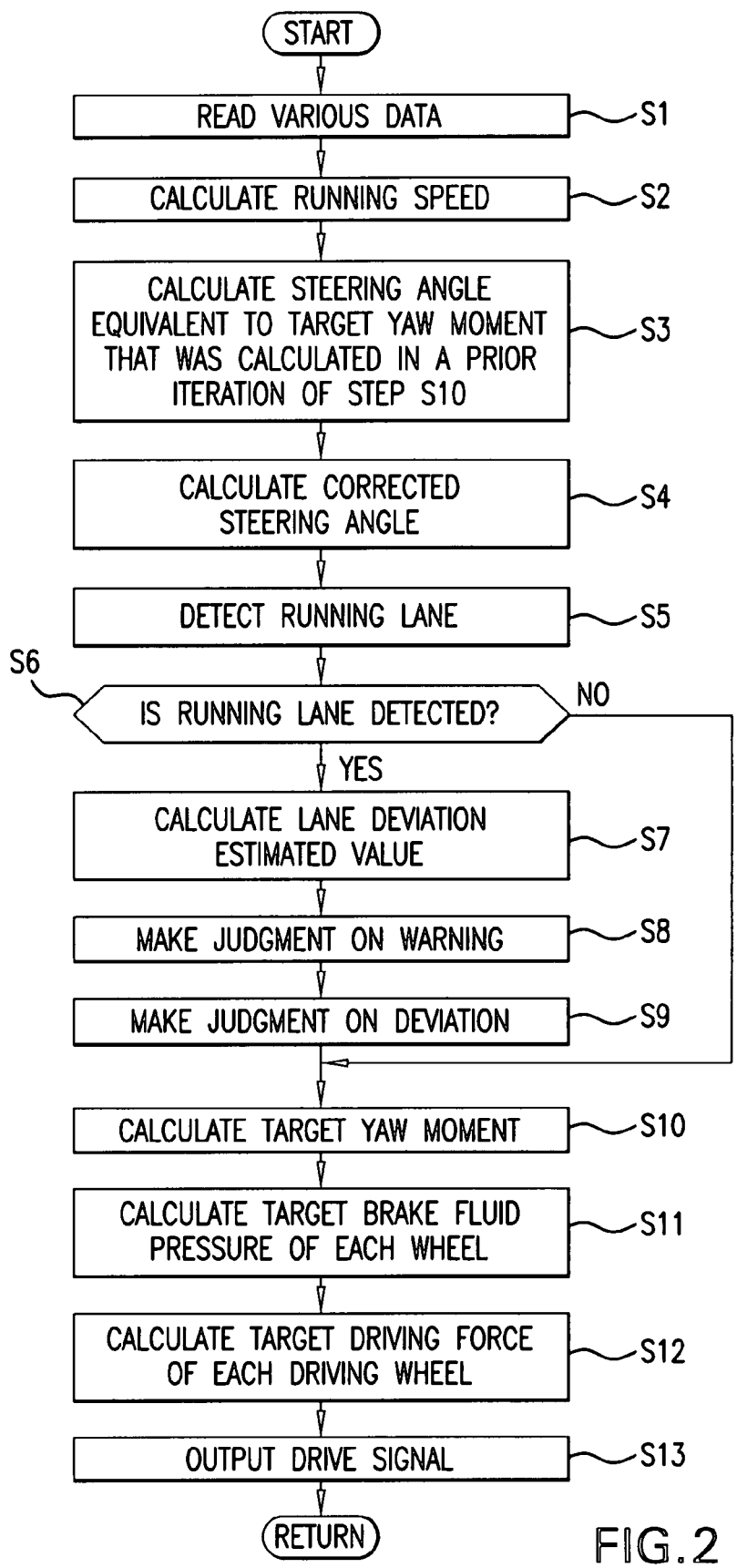
FIG. 2 is a flow chart of an information processing executed by a braking/driving force control unit of the system of FIG. 1.

In the foregoing, the various sensors in FIG. 1 and camera controller 14 and steps S1, S5 in FIG. 2 constitute a running condition detecting means or device in the present invention. Similarly, steps S4, S5 in FIG. 2 constitute a lane detecting means or device, step S9 in FIG. 2 a lane deviation judging means or device, steps S11, S13, brake fluid pressure control circuit 7 and driving torque control unit 12 constitute a vehicle behavior control means or device, steering angle sensor 19 in FIG. 1 and step S1 in FIG. 2 constitute a steering condition parameter detecting means or device, steps S11, S12 in FIG. 2 constitute a braking/driving force control amount calculating means or device, and step S13 in FIG. 2 and brake fluid pressure control circuit 7 and driving torque control unit 12 in FIG. 1 constitute a braking/driving force control means or device.

The entire contents of Japanese Patent Application P2002-346378 (filed Nov. 28, 2002) are incorporated herein by reference.

Although the invention has been described above by reference to a certain embodiment of the invention, the invention is not limited to the embodiment described above. Modifications and variations of the embodiment described above will occur to those skilled in the art, in light of the above teachings. For example, while in the embodiment described above, the lateral displacement limit value $X_C$ that serves as a threshold value for judgment on lane deviation of the vehicle is calculated from the width of the vehicle and the width of the running lane, it can be fixed at 0.8 meters since the lanes of the highways in Japan are fixed so as to be 3.35 meters in width. The scope of the invention is defined with reference to the following claims.

What is claimed is:

1. A system for preventing lane deviation of a vehicle, comprising:
   a steering condition parameter detecting device that detects a steering condition parameter;
   a lane detecting device that detects a running lane of the vehicle based on the steering condition parameter;
   a running condition detecting device that detects a running condition of the vehicle;
   a deviation judging device that judges based on the detected running lane and the detected running condition of the vehicle whether the vehicle has a tendency to deviate from the running lane; and
   a vehicle behavior control device that controls a behavior of the vehicle so as to iteratively generate a yaw moment in the direction to prevent the vehicle from deviating from the running lane in accordance with the detected running condition when the deviation judging device judges that the vehicle has a tendency to deviate from the running lane;
   wherein the lane detecting device corrects the detected steering condition parameter by a steering condition parameter equivalent to the yaw moment generated by the vehicle behavior control device in a prior iteration and detects the running lane based on the corrected steering condition parameter when the vehicle behavior control device controls a behavior of the vehicle.

2. A system according to claim 1, further comprising a steering angle sensor for detecting a steering angle of a steering wheel, wherein the lane detecting device corrects the detected steering angle by a steering angle equivalent to the yaw moment generated by the vehicle behavior control device in the prior iteration and detects the running lane based on the corrected steering angle.

3. A system according to claim 1, wherein the vehicle behavior control device comprises a braking/driving force control amount calculating device that calculates a braking/driving force control amount of each wheel of the vehicle so as to generate the yaw moment in the direction to prevent the vehicle from deviating from the running lane and a braking/driving force control device that controls a braking/driving force of each wheel of the vehicle in accordance with the calculated braking/driving force control amount.

4. A system according to claim 1, wherein the deviation judging device judges that the vehicle has a tendency to deviate from the running lane when an absolute value of an estimated lateral displacement in future is equal to or larger than a lateral displacement limit value.

5. A system according to claim 4, wherein the estimated lateral displacement in future is an estimated lateral displacement of the vehicle from a center of the running lane after a headway time.

6. A system according to claim 5, wherein the lateral displacement limit value is a value obtained by subtracting a half of a width of the vehicle from a half of a width of the running lane.

7. A system for preventing lane deviation of a vehicle, comprising:
- a steering condition parameter detecting means for detecting a steering condition parameter;
- lane detecting means for detecting a running lane of the vehicle based on the steering condition parameter;
- running condition detecting means for detecting a running condition of the vehicle;
- deviation judging means for judging based on the detected running lane and the detected running condition whether the vehicle has a tendency to deviate from the running lane; and
- vehicle behavior control means for controlling a behavior of the vehicle in a way as to iteratively generate a yaw moment in the direction to prevent the vehicle from deviating from the running lane in accordance with the detected running condition when the deviation judging means judges that the vehicle has a tendency to deviate from the running lane;
- wherein the lane detecting means corrects the detected steering condition parameter by a steering condition parameter equivalent to the yaw moment generated by the vehicle behavior control means in a prior iteration and detects the running lane based on the corrected steering condition parameter when the vehicle behavior control means controls a behavior of the vehicle.

8. A method for preventing lane deviation of a vehicle comprising:
- detecting a steering condition parameter;
- detecting a running lane of the vehicle based on the steering condition parameter;
- detecting a running condition of the vehicle;
- judging based on the detected running lane and the detected running condition whether the vehicle has a tendency to deviate from the running lane; and
- controlling a behavior of the vehicle so as to iteratively generate a yaw moment in the direction to prevent the vehicle from deviating from the running lane in accordance with the detected running condition when the vehicle is judged to have a tendency to deviate from the running lane;
- wherein the step of detecting the running lane comprises correcting the detected steering condition parameter by a steering condition parameter equivalent to the yaw moment generated by the controlling of the vehicle behavior in a prior iteration and detecting the running lane based on the corrected steering condition parameter when the behavior of the vehicle is controlled.

9. A method according to claim 8, further comprising detecting a steering angle of a steering wheel, wherein the detecting of the running lane comprises correcting the detected steering angle by a steering angle equivalent to the yaw moment generated by the controlling of the vehicle behavior in the prior iteration and detecting the running lane based on the corrected steering angle.

10. A method according to claim 8, wherein the controlling of the vehicle behavior comprises calculating a braking/driving force control amount of each wheel of the vehicle so as to generate a yaw moment in the direction to prevent the vehicle from deviating from the running lane and controlling a braking/driving force of each wheel of the vehicle in accordance with the braking/driving force control amount.

* * * * *